United States Patent [19]

Okada et al.

[11] Patent Number: 5,014,982

[45] Date of Patent: May 14, 1991

[54] MEMORY CARTRIDGE AND GAME APPARATUS USING THE SAME

[75] Inventors: Satoru Okada; Kenji Nishizawa, both of Kyoto, Japan

[73] Assignee: Nintendo Company Limited, Kyoto, Japan

[21] Appl. No.: 235,657

[22] Filed: Aug. 24, 1988

[30] Foreign Application Priority Data

Aug. 26, 1987 [JP] Japan ................................ 62-212448

[51] Int. Cl.$^5$ ................................................ A63F 9/22
[52] U.S. Cl. ................................ 273/435; 273/85 G; 364/410
[58] Field of Search ................ 273/1 E, 148 B, 85 G, 273/DIG. 28; 364/410

[56] References Cited

U.S. PATENT DOCUMENTS

| | | | |
|---|---|---|---|
| 4,095,791 | 6/1978 | Smith | 273/85 G |
| 4,120,030 | 10/1978 | Johnstone | 364/200 |
| 4,149,027 | 4/1979 | Asher et al. | 174/52.1 |
| 4,218,582 | 8/1980 | Hellman | 380/30 |
| 4,352,492 | 10/1982 | Smith | 273/1 GC |
| 4,368,515 | 1/1983 | Nielsen | 364/200 |
| 4,383,296 | 5/1983 | Sander | 364/200 |
| 4,384,326 | 5/1983 | Devchoudhury | 364/200 |
| 4,386,773 | 6/1983 | Bronstein | 273/1 E |
| 4,432,067 | 2/1984 | Nielsen | 364/900 |
| 4,442,486 | 4/1984 | Mayer | 364/200 |
| 4,446,519 | 5/1984 | Thomas | 364/300 |
| 4,454,594 | 6/1984 | Heffron et al. | 364/900 |
| 4,458,315 | 7/1984 | Uchenick | 380/4 |
| 4,462,076 | 7/1984 | Smith III | 364/200 |
| 4,471,163 | 9/1984 | Donald | 178/22.08 |
| 4,485,457 | 11/1984 | Balaska | 364/900 |
| 4,492,582 | 1/1985 | Chang | 434/169 |
| 4,500,879 | 2/1985 | Smith III et al. | 340/739 |
| 4,562,306 | 12/1985 | Chou | 380/4 |
| 4,575,621 | 3/1986 | Dreifus | 235/380 |
| 4,575,622 | 3/1986 | Pellegrini | 235/382 |
| 4,620,707 | 11/1986 | Lippincott | 273/148 B |
| 4,738,451 | 4/1988 | Logg | 273/153 R |
| 4,752,068 | 6/1988 | Endo | 273/1 E |
| 4,757,468 | 7/1988 | Domenik et al. | 364/900 |
| 4,858,930 | 8/1989 | Sato | 273/85 G |

FOREIGN PATENT DOCUMENTS

0114522  1/1984  European Pat. Off. .

OTHER PUBLICATIONS

Gauntlet home video game cartridge, instruction booklet and packaging, manufactured by Tengen.

Primary Examiner—Edward M. Coven
Assistant Examiner—Jessica J. Harrison
Attorney, Agent, or Firm—Nixon & Vanderhye

[57] ABSTRACT

A memory cartridge (10) is attachably/detachably loaded to a game machine (22) which includes a microprocessor (24) and a working RAM (26) provided in association with the microprocessor. When the memory cartridge is loaded to the game machine, a program ROM (18) included in the memory cartridge is connected to the microprocessor and the working RAM through data bus and address bus such that the data can be communicated between them. When a game is terminated, a password is generated in accordance with a program stored in the program ROM in advance by modifying game status data including data of score, power or energy and the stage number which are stored in the working RAM. The password thus generated is displayed on a display. When the password is inputted by a player prior to consecutively starting a succeeding game in accordance with the display, by restoring the inputted password, the game status data is set in the working RAM, whereby the microprocessor consecutively starts the succeeding game from the game status at the timing when the preceding game was terminated.

14 Claims, 12 Drawing Sheets

| ADDRESS | 26 | |
|---|---|---|
| 0000H | BUFF 0 | ⎫ |
| 1H | BUFF 1 | ⎪ |
| 2H | BUFF 2 | ⎬ WORKING AREA FOR |
| 3H | BUFF 3 | ⎪ PASSWORD BUFFERS |
| 4H | BUFF 4 | ⎪ |
| 5H | BUFF 5 | ⎭ |
| 6H | BOFF | OFFSET DATA OF PASSWORD BUFFERS |
| 7H | WORD 0 | ⎫ |
| 8H | WORD 1 | ⎪ |
| 9H | WORD 2 | ⎪ |
| AH | WORD 3 | ⎬ AREA FOR |
| BH | WORD 4 | ⎪ PASSWORD STORING BUFFERS |
| CH | WORD 5 | ⎪ |
| DH | WORD 6 | ⎪ |
| EH | WORD 7 | ⎭ |
| FH | WOFF | OFFSET DATA OF PASSWORD STORING BUFFERS |
| 10H | RAND | RANDOM NUMBERS STORING AREA |
| 11H | COUNT | COUNTER |
| 12H | SFCUN | COUNTER |
| 13H | POINT 0 | DATA OF SCORE (THOUSANDS, HUNDREDS) |
| 14H | POINT 1 | DATA OF SCORE (TENS, UNITS) |
| 15H | POWER | DATA OF POWER |
| 16H | STAGE | DATA OF STAGE NUMBER |
| 17H | SUM | SUM-CHECK DATA |

MEMORY CARTRIDGE AND GAME APPARATUS USING THE SAME

BACKGROUND OF THE INVENTION

1. Field of the invention

The present invention relates to a memory cartridge and a game apparatus using the same. More specifically, the present invention relates to a memory cartridge which is attachably/detachably loaded to a game machine which includes a microprocessor, and a game apparatus including the same.

2. Description of the prior art

As this kind of the game apparatus, "Family Computer (trademark)" or "Nintendo Entertainment System (trademark)" is well known, which is manufactured and sold by the same assignee of the present invention. Such a game apparatus is constructed by loading a game cartridge which may be called as a ROM cartridge or a memory cartridge to a main unit of a game machine. Since a ROM (Read Only Memory) is generally used in the memory cartridge, it is impossible to store data indicating game status (hereinafter called as "game status data") including the data of score, power or energy, stage number and etc. at the time when the game is terminated. Therefore, since the game is always started from the beginning thereof, it is impossible to consecutively start the succeeding game from the game status at the time when the preceding game was terminated.

In order to resolve such a disadvantage, a back-up RAM (Random Access Memory which is a readable/writable memory) may be provided in addition to the ROM where the back-up RAM is enabled by a battery as disclosed in, for example, European Patent Publication No. 0268419 which was filed by the same assignee of the present invention. If such a back-up RAM is provided, it is possible to write the game status data in the back-up RAM at the time when the preceding game was terminated, whereby the player or operator can play or enjoy the succeeding game from the consecutive game status.

However, in the above described prior art, the back-up RAM and the battery are needed for backing-up the game status data, and therefore, the memory cartridge becomes not only complex but also high cost.

Another method using a magnetic disk instead of the memory cartridge is known as done in "Family Computer Disk System (trademark)" which is manufactured and sold by the same assignee of the present invention. In the system using the magnetic disk, likewise the above described prior art, it is possible to write the game status data in the magnetic disk so as to be able to consecutively play the same game. However, since the magnetic disk is utilized, the data is easily destroyed in accordance with a circumferential magnetic state, and the data such as a program is to be loaded from the magnetic disk to the RAM of the game machine prior to starting the game, and therefore, operation thereof becomes troublesome in comparison with the system using the conventional memory cartridge.

SUMMARY OF THE INVENTION

Therefore, a principal object of the present invention is to provide a memory cartridge and the game apparatus using the same, in which it is possible to store the game status data so as to be able to start the game consecutively even though the memory cartridge includes a ROM.

Another object of the present invention is to provide a novel game apparatus utilizing a password.

Another object of the present invention is to provide a novel memory cartridge which can be utilized for such a novel game apparatus.

The other object of the present invention is to provide a memory cartridge and a game apparatus capable of preventing a password from being inputted iniquitously.

A memory cartridge in accordance with the present invention is attachably/detachably loaded to a game machine which includes a microprocessor and a data storage provided in association with the microprocessor, and comprises a first program means for generating a password based upon game status data being stored in the data storage, a second program means for inputting the password generated in accordance with the first program means, and a third program means for setting the game status data in the data storage based upon the inputted password.

A game apparatus in accordance with the present invention comprises a microprocessor, a program memory connected to the microprocessor for storing a program to operate the microprocessor, a game terminating means provided in association with the microprocessor for terminating a game being executed by the microprocessor in accordance with the program stored in the program memory, a password generating means for generating a password based upon game status data being stored in the data storage at the time when the game was terminated by the game terminating means, a displaying means for displaying the password generated by the password generating means, instructing means for instructing to consecutively start the game, an inputting means for causing an operator to input the password when instruction for consecutively starting the game is inputted by the instructing means, and a data setting means for setting the game status data in the data storage based upon the inputted password.

The microprocessor executes a predetermined game based upon program data and character data from the program ROM and the character ROM of the memory cartridge in accordance with operation of a controller by the operator.

When instruction for terminating the game is inputted by, for example, depressing a game termination switch or determination of the microprocessor itself, the microprocessor generates a password in accordance with a program stored in the program ROM of the memory cartridge based upon the game status data which includes data of, for example, score, power or energy, stage number, etc. and is stored in a working RAM, for example. The password thus generated is displayed on a TV monitor.

The operator notes the displayed password for the succeeding game.

Next, when it is instructed that the game is to be consecutively started ("Continue") by the operator, the microprocessor makes a predetermined display on the monitor so that the operator can input the password in accordance therewith. Then, the microprocessor decodes the inputted password in accordance with the program stored in the program ROM so as to restore the game status data in a predetermined data area of the working RAM, for example. Therefore, the microprocessor can consecutively start the succeeding game from the game status at the time when the preceding game was terminated in accordance with the game status data thus restored.

In accordance with the present invention, even though the ROM is used for the memory cartridge, it is possible to consecutively start the succeeding game from the game status at the time when the preceding game was terminated without any specific additional means such as a back-up RAM and a battery.

The objects and other objects, features, aspects and advantages of the present invention will become more apparent from the following detailed description of the embodiments of the present invention when taken in conjunction with accompanying drawings.

DETAIL DESCRIPTION OF THE PREFERRED EMBODIMENTS

Figure 1:
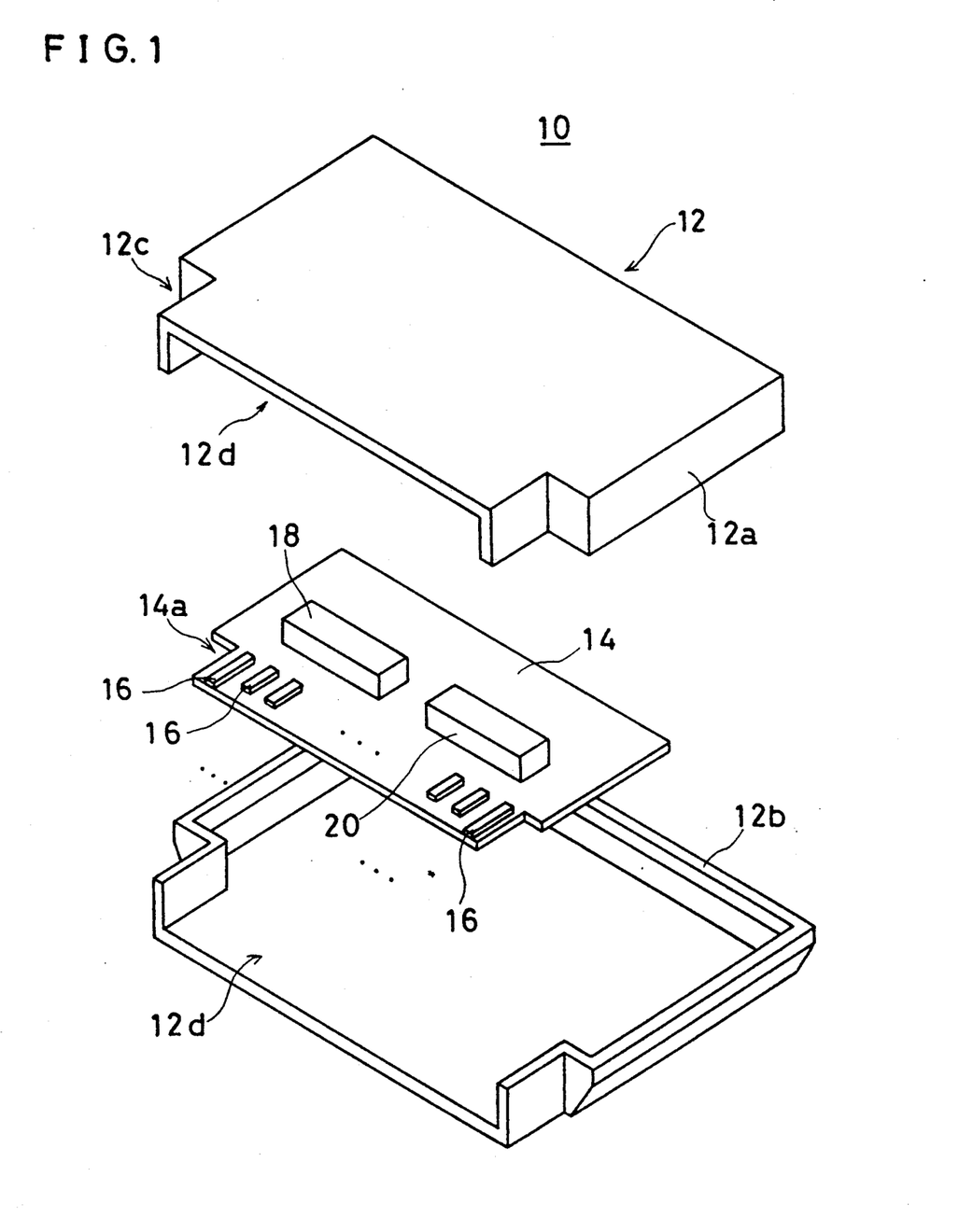
FIG. 1 is a disassembled perspective view showing a memory cartridge of one embodiment in accordance with the present invention.

With reference to FIG. 1, a memory cartridge 10 of one embodiment in accordance with present invention includes a case 12 formed by an upper case 12a and a lower case 12b. The case 12 is formed nearly in a rectangle, and protruding portion 12c is formed at one side thereof. An opening 12d is formed by the protruding portion 12c and the other sides of the case 12 are closed by sidewalls.

A printed circuit board 14 is housed in the case 12, and a protruding portion 14a is formed at the portion of the printed circuit board 14 corresponding to the above described protruding portion 12c of the case 12. The protruding portion 14a of the printed circuit board 14 is exposed through the opening 12d of the case 12. On the protruding portion 14a, conductive patterns or connecting electrodes 16a-16n constituting a connecting means to an edge connector 23 (FIG. 2) of a game machine main unit 22 as described later are formed so as to be distributed in a direction that the side of the protruding portion 14a extends.

A program memory 18 includes of a non-volatile semiconductor memory, for example, a ROM or EE-PROM is mounted on one main surface of the printed circuit board 14. The program memory 18 has a memory area of, for example, 1Mbits, wherein a program data required for execution of a predetermined operation of a microcomputer 24 (FIG. 2) included in the game machine main unit 22 is stored in advance. Also, a character memory 20 consisting of a similar non-volatile semiconductor memory is mounted on the printed circuit board 14. The character memory 20 has a memory area of, for example, 1Mbits, wherein data relating to characters to be displayed (character data) is stored in advance.

Figure 2:
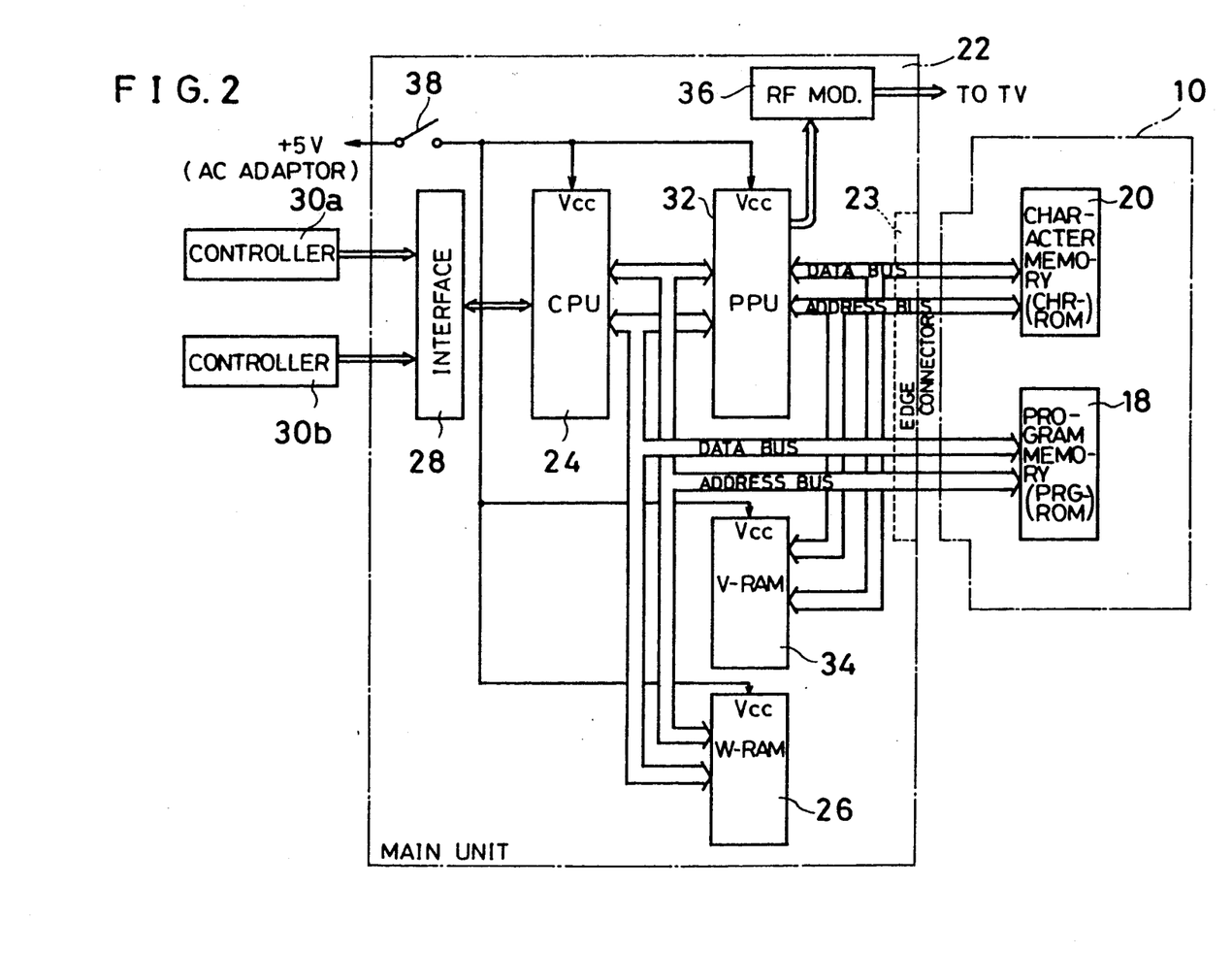
FIG. 2 is a block diagram showing a game apparatus for which a memory cartridge as shown in FIG. 1 can be utilized.

The game machine main unit 22 as one example of the data processing apparatus for which the cartridge of the embodiment can be utilized is constituted as shown in FIG. 2. The electrodes 16a-16n of the cartridge 10 are inserted into the edge connector 23 of the main unit 22, thereby the both are electrically connected to each other so as to constitute a game apparatus.

The main unit 22 includes 8-bit microprocessor (CPU) 24 such as an integrated circuit "2A03" manufactured by Nintendo Co., Ltd., and game controllers 30a and 30b are connected to the microcomputer 24 through an I/O interface 28.

Furthermore, a working RAM (W-RAM) 26 which is a data storage in association with the microcomputer 24, PPU (Picture Processing Unit) 32, a video RAM (V-RAM) 34 and an RF modulator 46 are installed in the main unit 22. As the PPU 32, for example, an integrated circuit "2CO2" manufactured by Nintendo Co., Ltd. can be utilized, and the same reads data of the character memory 20 and the V-RAM 34 under the control of the microcomputer 24 and converts such read data into a video signal which is then given to an RF modulator 36. The RF modulator 36 modulates the given video signal and outputs the same as a television signal of, for example, NTSC standard for a television receiver which is an image monitoring means.

As described above, the memory cartridge 10 is connected to the edge connector 23 through which various kinds of data or signals are given to the memory cartridge 10 from the microcomputer 24 and the PPU 32 of the game machine main unit 22. More specifically, the program memory 18 receives for example, a 14-bit program address and 8-bit data from the microcomputer 24 through the edge connector 23. On the other hand, 14-bit character address and 8-bit data are given to the character memory 20 from the PPU 32.

Figure 3:
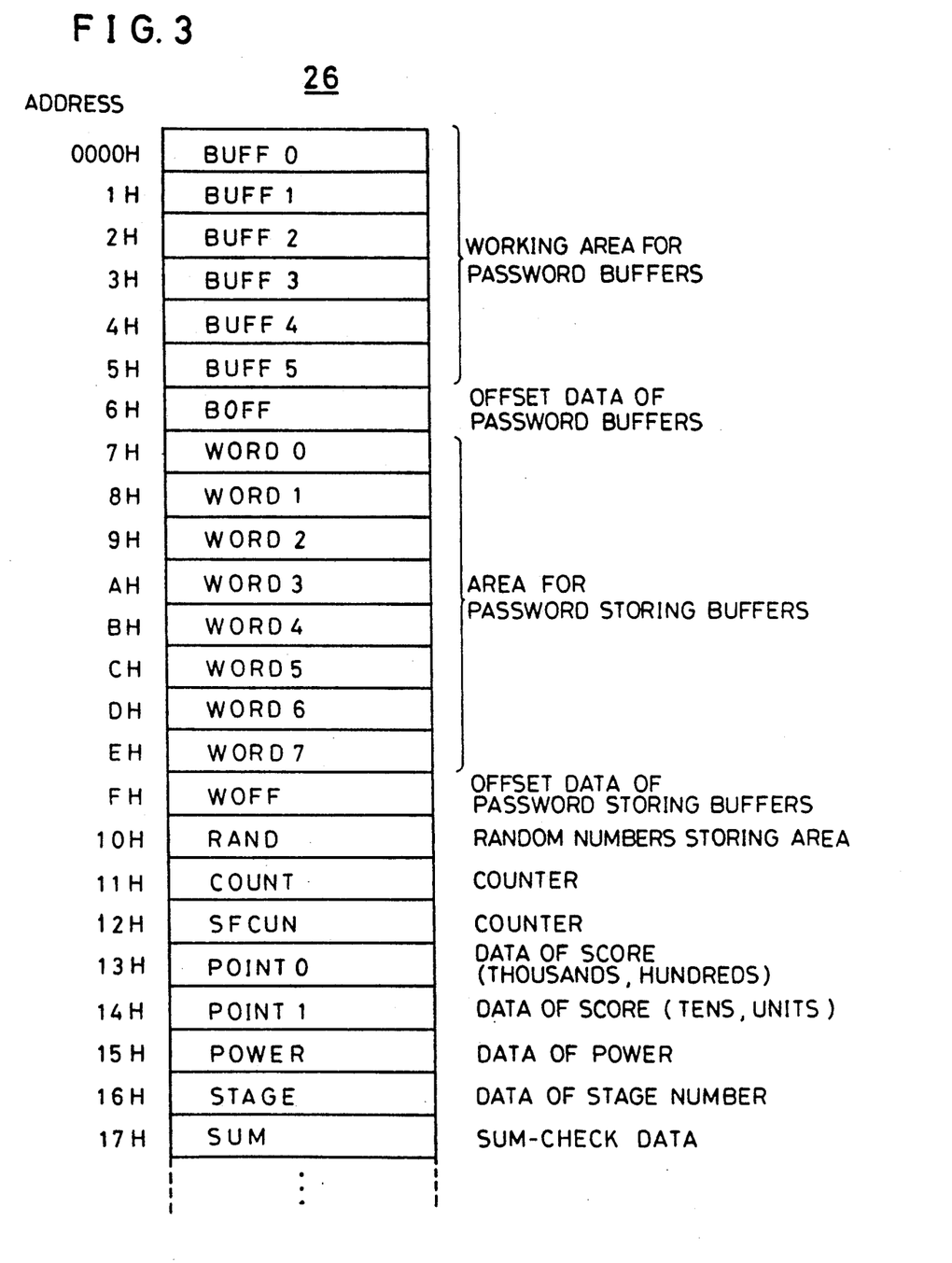
FIG. 3 is an illustrative view showing a memory map of a working RAM (W-RAM).

In FIG. 3, a memory map of the W-RAM 26 included in the game machine main unit 22 is shown. In the W-RAM 26, as shown in FIG. 3, data areas required for generating a password is assigned in the addresses "0000H-0017H".

In the addresses "0000H-0005H", working buffer areas for the password (hereinafter called as "buffer areas") BUFF0-BUFF5 are formed. The buffer areas BUFF0-BUFF5 are utilized as data areas for generating or restoring the password. In the address "0006H", password buffer offset data area BOFF is formed as a pointer data area for the buffer areas BUFF0-BUFF5. In the addresses "0007H-000EH", password storing buffer areas WORD0–WORD7 for storing the password generated by the microcomputer 24 or inputted by the operator are formed. In the address "000FH", a password storing buffer offset data area WOFF is formed as a pointer data area for the password storing buffer areas WORD0-WORD7.

In the address "0010H", a random number data area RAND for storing random number which is utilized for modifying the password by shifting the same, as described later is formed. The address "0011H" is formed as a counter COUNT which is utilized in right-shifting or left-shifting the data stored in the buffer areas BUFF0-BUFF7 or the data stored in the password storing buffer areas WORD0-WORD7 by 6 bits as described later. The password is generated by shifting the data of the buffer areas BUFF0-BUFF5 in accordance with the random number data. In order to count the number of times of such shifting in generating the password, the address "0012H" is formed as a shift counter SFCUN.

The addresses "0013H" and "0014H" are formed as score data areas POINT0 and POINT1 for storing the score being obtained in accordance with progress of the game. In the score data area POINT0, the upper two digits of the score, that is, thousands and hundreds of the score are stored, and the lower two digits of the score, that is, tens and units are stored in the score data area POINT1. The address "0015H" is formed as a power data area POWER in which data of power or energy required for continuing the game is stored. The address "0016H" is formed as a stage number data area STAGE for storing the stage number which is data indicating what number of the stage is now progressing in the case where a single game is consisting of a plurality of stages. Then, the address "0017H" is formed as a sum data area SUM for storing the sum data obtained by sum-check as described later.

Now, a description is made of the relationship of the number of digits, the kinds of characters and the number of bits of the password. As the character for the password, in this embodiment shown, numerals, and capital letters and small letters of the alphabet are utilized because such characters need to be easily understood and kept in the operator's mind. Since these characters can be represented by the number of characters of $2^6 = 64$, each of the characters is represented as 6-bit data. If each of the characters is represented as 8-bit data to increase the number of characters by 256 ($=2^8$), it becomes more difficult for the operator to remember. Therefore, in this exemplary embodiment, each of the characters of the password is represented as 6 bits rather than 8 bits. Inversely, when the number of bits of one character is decreased, the number of digits of the password increases, whereby it becomes difficult to be understood or kept in mind by the operator. Therefore, in this embodiment shown, the kinds of characters (the number of bits of each of the characters) and the number of digits of the password are suitably selected so as to be easily understood and kept in the operator's mind.

Next, with reference to FIG. 1–FIG. 3, operation or action of this embodiment as shown in FIG. 4 and FIG. 5–FIG. 14 associated therewith will be described.

Figure 4:
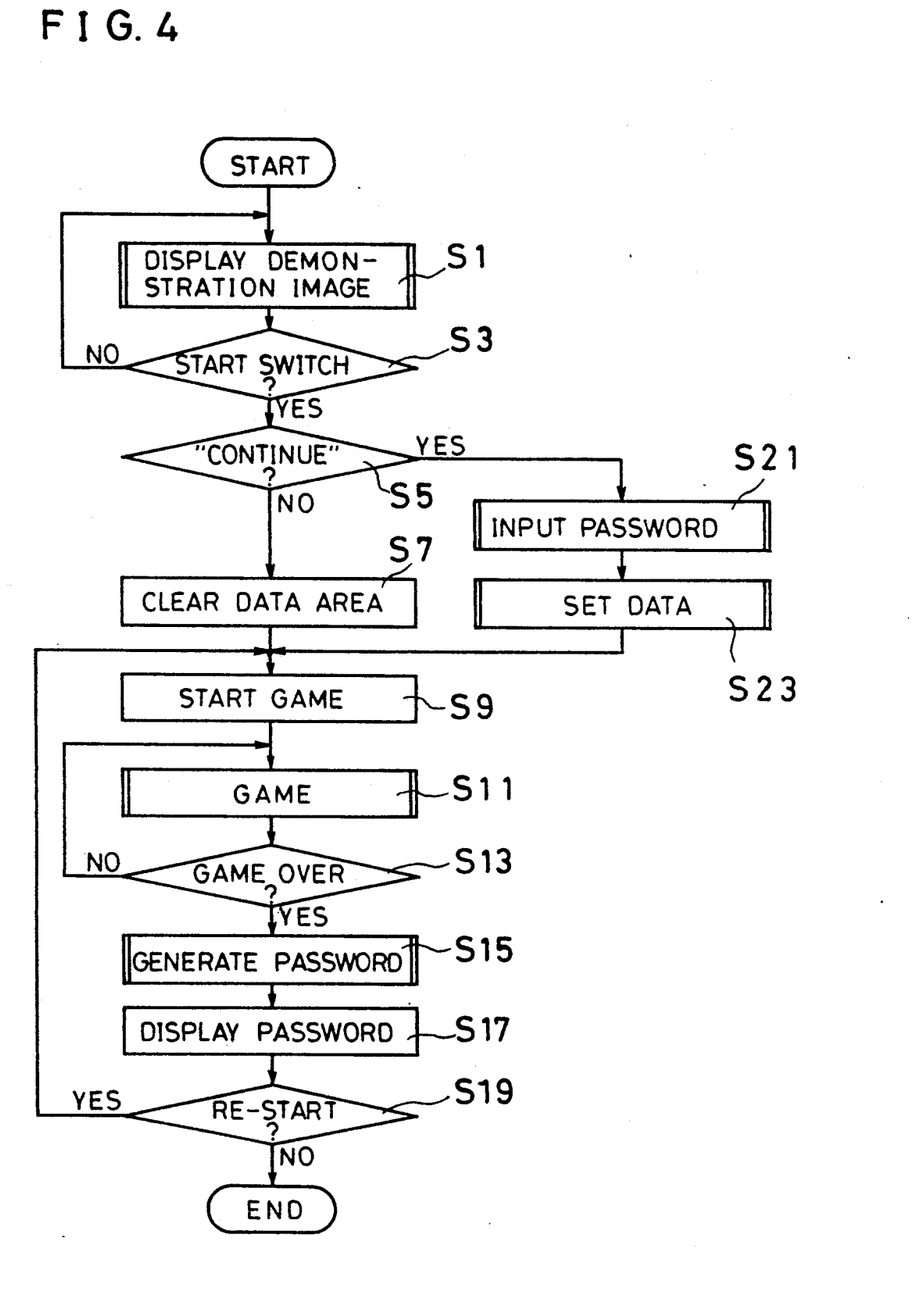
FIG. 4 is a flowchart showing a main routine of operation or action of the embodiment.

In the first step S1 of FIG. 4, the microcomputer 24 causes the TV monitor (not shown) to display a demonstration image including an image representing the procedure or content of the game as summarized on the screen thereof in accordance with the program stored in the program memory 18 in advance.

In the next step S3, if the microcomputer 24 detects that a start button (not shown) being provided on the controller 30a and/or 30b is depressed, in the next step S5, the microcomputer 24 determines whether or not "Continue" is instructed, that is, whether or not the game is to be consecutively started. Such "Continue" can be inputted by pointing the image of "Continue" being displayed on the TV monitor (not shown) by a cursor through operation of buttons of the controller 30a and/or 30b by the operator.

In the initial state, it is not "Continue", therefore, the process proceeds to the step S7 wherein the microcomputer 24 clears the whole data areas of the W-RAM 26 as shown in FIG. 4 for execution of the succeeding game, and starts the game in the step S9.

In the step S11, as well known in the aforementioned "Family Computer (trademark)" or "Nintendo Entertainment System (trademark)", the game is executed based upon the program data and character data being stored in advance in the program memory 18 and the character memory 20 through cooperation of the microcomputer 24 and the PPU 32. During execution of the game, by operating the controller 30a and/or 30b by the operator, signals are applied to the microcomputer 24 such that various operation or modification or change can be applied to the image being displayed on the TV monitor.

If the microcomputer 24 detects game-over in the step S13, the process proceeds to the next step S15. Such game over can be instructed by operating the controller 30a and/or 30b by the operator. On the other hand, if the microcomputer 24 determines the game cannot be continued based upon the data of the power or energy of the power data area POWER in the W-RAM 26 as shown in FIG. 3, the game will be terminated.

Figure 5:
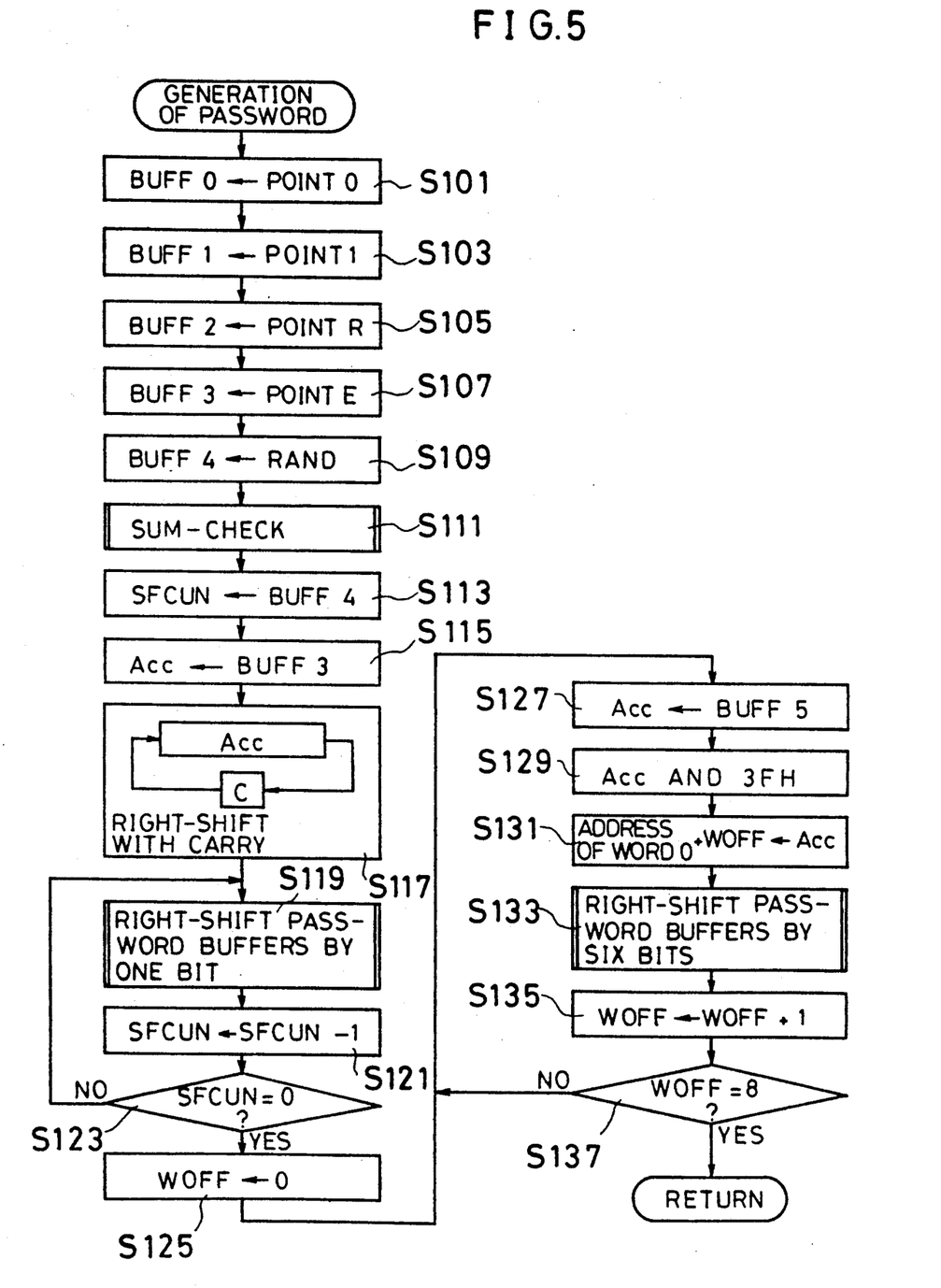
FIG. 5 is a flowchart showing a subroutine for generating a password.

The generation of password in the following step S15 is performed in accordance with a subroutine as shown in FIG. 5.

With reference to FIG. 5, the data stored in the score data area POINT0 of the W-RAM 26 is loaded to the buffer area BUFF0 in the step S101, the data stored in the score data area POINT1 is loaded to the buffer area BUFF1 in the step S103, the data stored in the power data area POWER is loaded to the buffer area BUFF2 in the step S105, and the data stored in the stage number area STAGE is loaded to the buffer area BUFF3 in the step S107.

Figure 6:
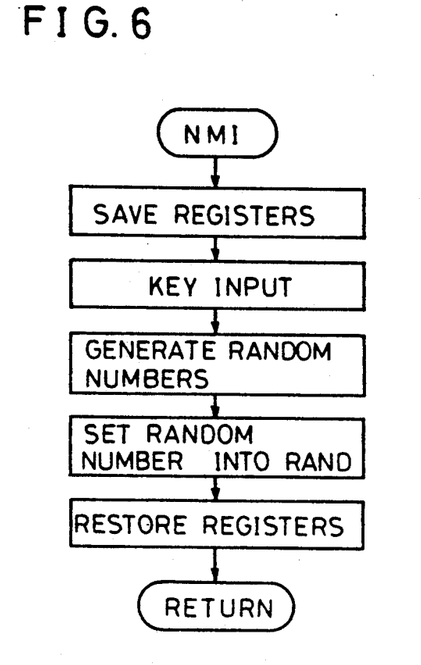
FIG. 6 is a flowchart showing an interrupt routine for generating random numbers.

In the step S109, the random number data stored in the random number data area RAND at the time when the game is terminated is loaded to the buffer area BUFF4. Such random number data is generated by NMI (Non-Maskable Interrupt) as shown in FIG. 6, for example. The NMI is executed for every 16 msec., for example, and different random number data is stored in the random data area RAND for each execution thereof.

Figure 7:
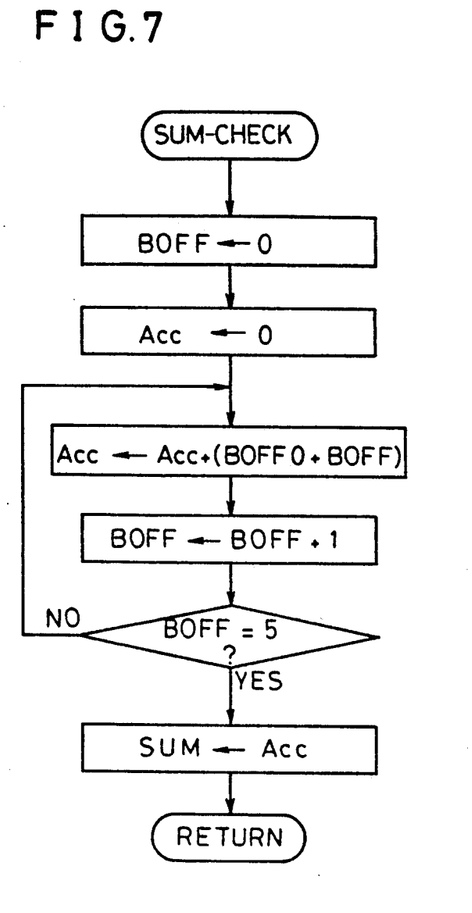
FIG. 7 is a flowchart showing a subroutine for sum-check.

Next, in the step S111, the microcomputer 24 performs the sum-check. Such a sum-check is executed in accordance with the subroutine as shown in FIG. 7. More specifically, in the sum-check routine as shown in FIG. 7, the values of the buffer areas BUFF0-BUFF4 are summed and the summed value, that is, the sum data is loaded to the accumulator Acc.

The reason why the sum-check data is utilized for generating the password is to prevent the password from being iniquitously inputted. More specifically, when the summed value of the buffer areas BUFF- 0-BUFF4 and the value of the buffer area BUFF5 is not coincident with each other, the result of the sum-check in the step 237 (FIG. 11 described later) is excluded. On the other hand, the probability of coincidence of the both is very small when an arbitrary password is inputted. Therefore, if the sum-check data is utilized for generating the password as done in this embodiment, it is effectively exclude a password which is iniquitously inputted by the operator.

Figure 5A:
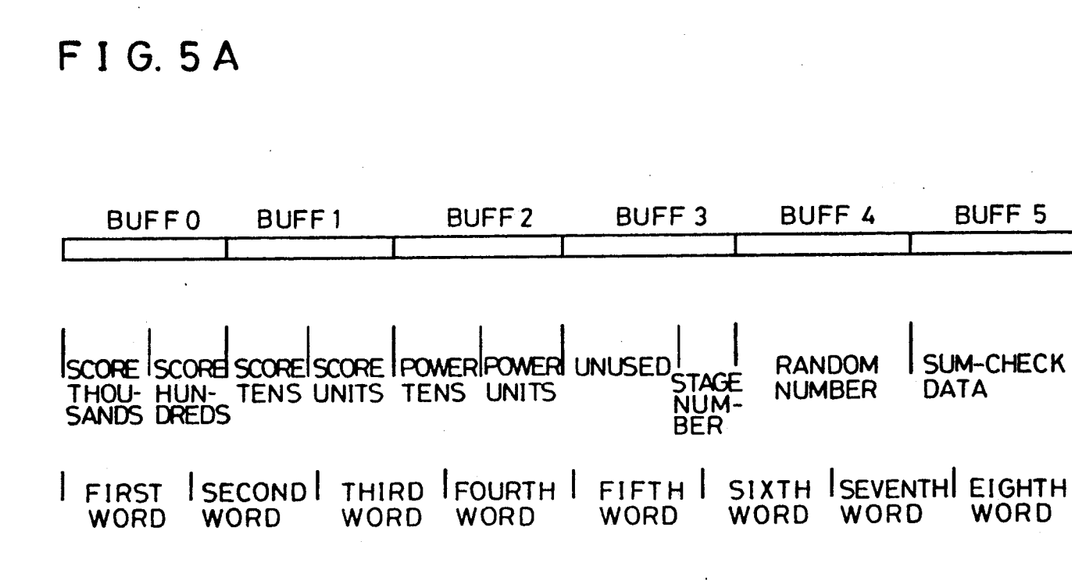
FIG. 5A is an illustrative view showing a state of buffer areas prior to beginning of shift operation.

Thus, at the stage where the step S111 was terminated, in the buffer areas BUFF0-BUFF3 of the W-RAM 26, as shown in FIG. 5A, the score data, the power data, the stage number data, the random number data and the sum-check data are respectively loaded.

In the next step S113 of FIG. 5, the microcomputer 24 loads the data in the buffer area BUFF4 of the W-RAM 26, that is, the random number data (step S109) to the shift counter SFCUN, and in the step S115, the microcomputer 24 loads the data of the buffer area BUFF3, that is, the stage number data to the accumulator Acc.

Next, in the step S117, the accumulator Acc is right-shifted such that the least significant bit of the buffer area BUFF3 is entered to the carrier flag C. Thus, the initial condition for shifting the buffer areas BUFF-0-BUFF3 is established.

Figure 8:
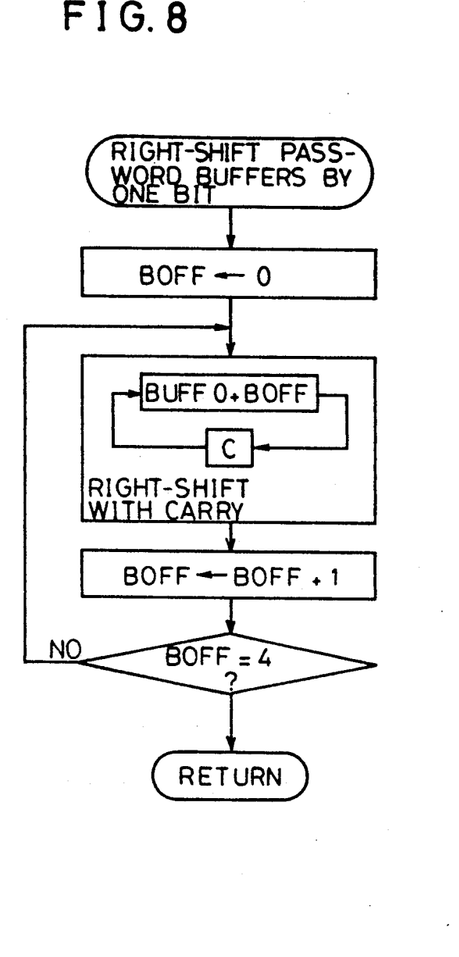
FIG. 8 is a flowchart showing a subroutine for right-shifting buffer areas by 1 bit.

In the next steps S119, S121 and S123, the microcomputer 24 causes the buffer areas BUFF0-BUFF3 to be right-shifted by 1 bit from the initial state as shown in FIG. 5A by the shifting times based on the random number data being loaded to the shift counter SFCUN. Such right-shifting by 1 bit is performed in accordance with a subroutine as shown in FIG. 8. Therefore, in the steps S119-S123, the data of a series of the buffer areas BUFF0-BUFF3 is right-shifted by the number of bits being designated by the random number loaded in the random number area RAND in the step S109. Thus, by changing the arrangement of the game status data and right-shifting the changed game status data based upon the random number data, the data which becomes the base of the password can be obtained.

Thus, in generating the password, since the game status data is not only gathered but also modified through shifting the same by the random numbers of bits, the password thus obtained has no regularity, whereby it is possible to prevent the password from being iniquitously inputted in accordance with a method having arbitrary regularity. Therefore, it is possible to effectively prevent the game from being consecutively started from the stage number which has not been reached by the operator by utilizing the password.

In the step S125, the microcomputer 24 clears the password storing buffer offset data area WOFF.

Next, in the step S127, the microcomputer 24 loads 8-bit data being stored in the buffer area as a result of shifting which has been executed in the previous step S119-S123 to the accumulator Acc. In the next step S129, the microcomputer 24 processes the data loaded in the accumulator Acc and the data 3FH, that is, "00111111" in AND manner. As a result thereof, in the step S129, the upper 2 bits of the buffer area BUFF5 is masked and the lower 6-bit data is resultingly obtained in the accumulator Acc.

The 6-bit data being loaded in the accumulator Acc is loaded to the buffer area which is pointed by an address obtained through adding the address of the password storing buffer area WORD0, that is, the head address 7H of the password storing buffer area and the value of the password storing buffer offset data area WOFF in the step S131.

Figure 9:
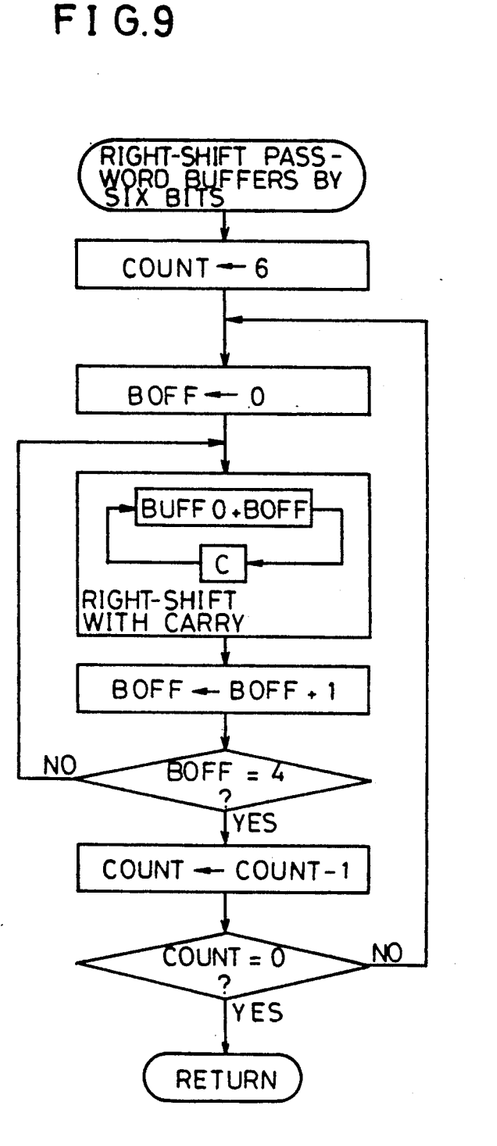
FIG. 9 is a flowchart showing a subroutine for right-shifting buffer areas by 6 bits.
Figure 10:
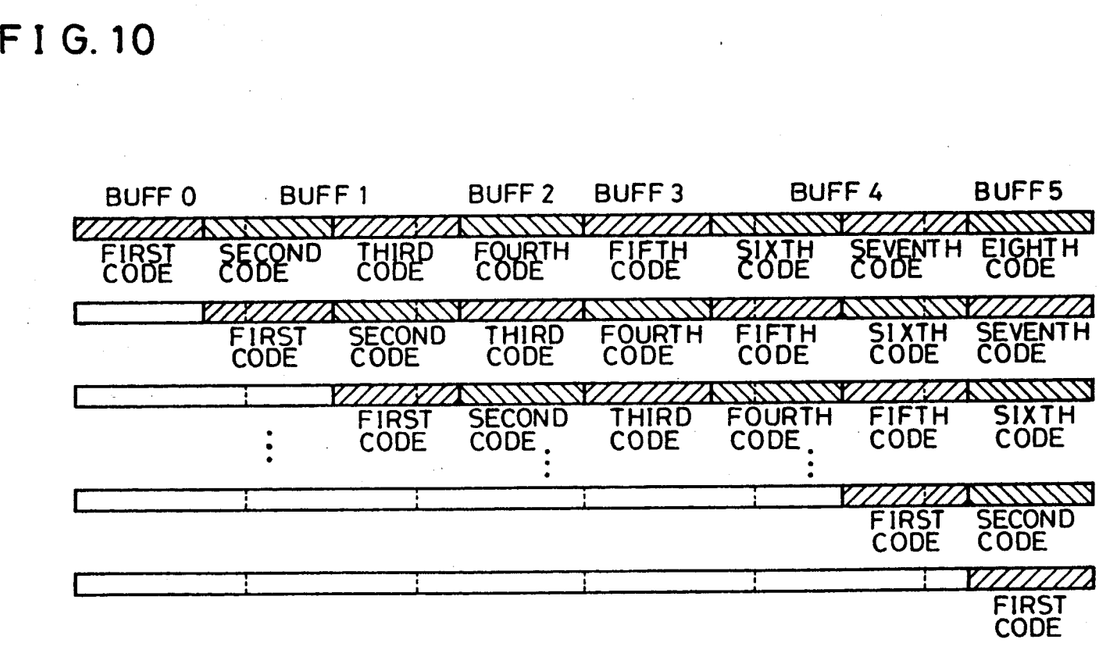
FIG. 10 is an illustrative view showing a state of right-shifting by 6 bits.

In the following step S133, the microcomputer 24 causes the buffer areas BUFF0-BUFF5 to be right-shifted by 6 bits as shown in FIG. 10 in accordance with a subroutine as shown in FIG. 9.

In the step S135, the password storing buffer offset data area WOFF is incremented by "1" and the above described steps S127-S135 are repeatedly executed until the time when it is determined that the data area WOFF becomes "8" in the step S137. Thus, in the password storing buffer areas WORD0-WORD7, the password having 8 digits each of which is 6 bits is stored. More specifically, when the total number of bits of the buffer areas BUFF0-BUFF5 is divided by the number of bits of one character, the result thereof becomes 8 digits (6 bytes $\times$ 8 bits/6 bits = 8 digits).

Returning to FIG. 4, in the step S15, the password generated as described above is displayed on the screen of the TV monitor (not shown) by the microcomputer 24 and the PPU 32. Therefore, the operator needs to take notes the displayed password of 8 digits.

In the step S19, it is determined whether or not re-start is instructed. If the re-start is instructed, the process returns to the previous step S9, and if not instructed, the process terminates as it is. More specifically, if the re-start is instructed without turning-off the power switch or unloading the cartridge after the game-over, it is possible to re-start from the game status of the proceeding time without inputting the password. In this case, the time when the game can be re-started in the step S19 may be limited within a predetermined time period.

On the other hand, when the power switch is turned off or the cartridge is unloaded without instructing the re-start, the data of the W-RAM 26 is volatilized.

Thereafter, when the game is to be re-started, the cartridge is loaded and the power switch is turned on. Then, the steps S1 and S3 are executed, and thereafter, if "Continue" is confirmed in the step S5, the process proceeds to the step S21 at this time. In the step S21, the password is inputted in accordance with a subroutine as shown in FIG. 11.

Figure 11:
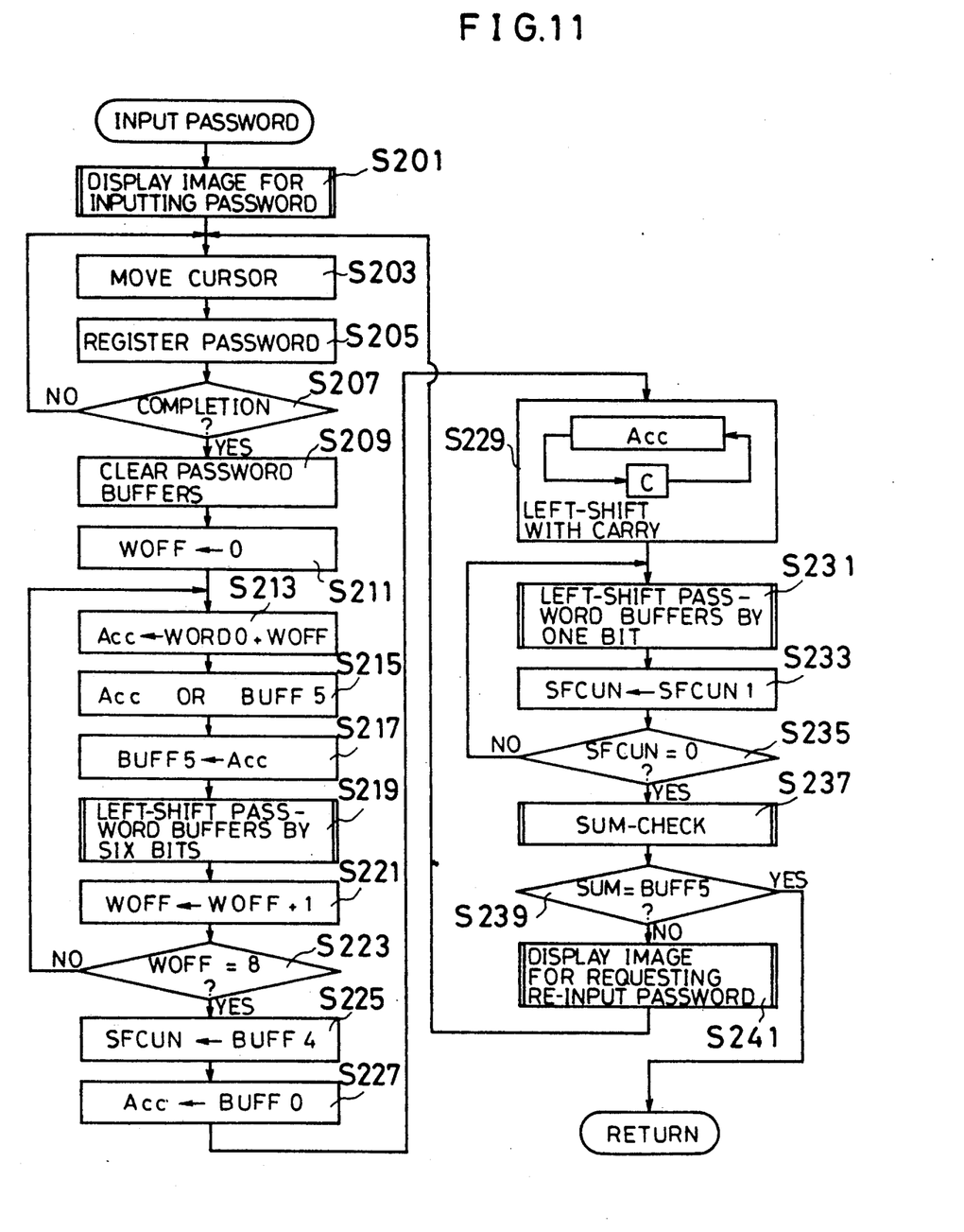
FIG. 11 is a flowchart showing a subroutine for in-putting a password.

The first step S201 of FIG. 11, the microcomputer 24 displays the image, for example, a list of numerals, and the capital letters and small letters of alphabet which causes the operator to input the password in cooperation with the PPU 32. Next, when the cursor is moved by the operator for inputting the password in the step S203, in the step S205, the microcomputer 24 registers one character of the inputted password in the password storing buffer areas WORD0-WORD7 as the cursor is moved. Then, operation of the steps S203-S207 is repeated by the number of times equal to the number of the digits of the password, thereafter, in the step S207, the microcomputer 24 determines whether or not the 8-digit password is wholly registered in the password storing buffer areas WORD0-WORD7. If all of the digits of the password have been registered in the password storing buffer areas WORD0-WORD7, in the step S209, the microcomputer 24 clears the buffer areas BUFF0-BUFF5, and in the step S211, the microcomputer 24 clears the password storing buffer offset data area WOFF.

In the step S213, the data of the buffer areas designated by an address through adding the address (7H) of the password storing buffer area WORD0 and the data of the offset data area WOFF is loaded to the accumulator Acc. Then, in the step S215, the microcomputer 24 processes the data of the accumulator Acc and the data of the buffer area BUFF5 in OR manner. Thereby, to the remaining 6 bits of the buffer area BUFF5 which is obtained by masking the upper 2 bits in the previous step S129 (FIG. 5), the upper 2 bits are added in accordance with the data of the accumulator Acc, and 8-bit data is restored resultingly. Then, in the step S217, such 8-bit data is loaded again to the buffer area BUFF5.

Figure 13:
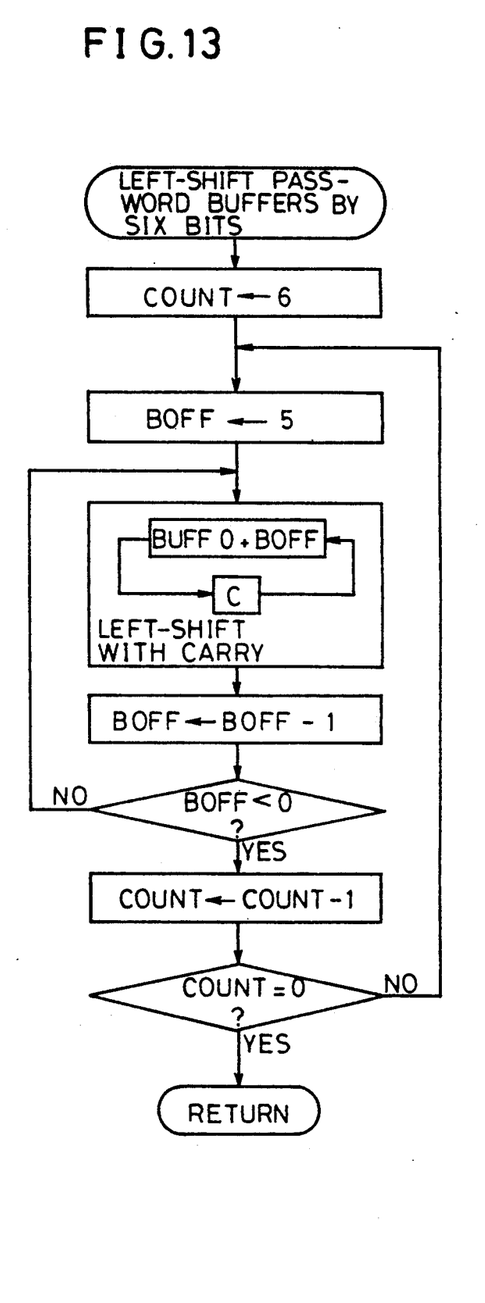
FIG. 13 is a flowchart showing a subroutine for left-shifting buffer areas by 6 bits.
Figure 14:
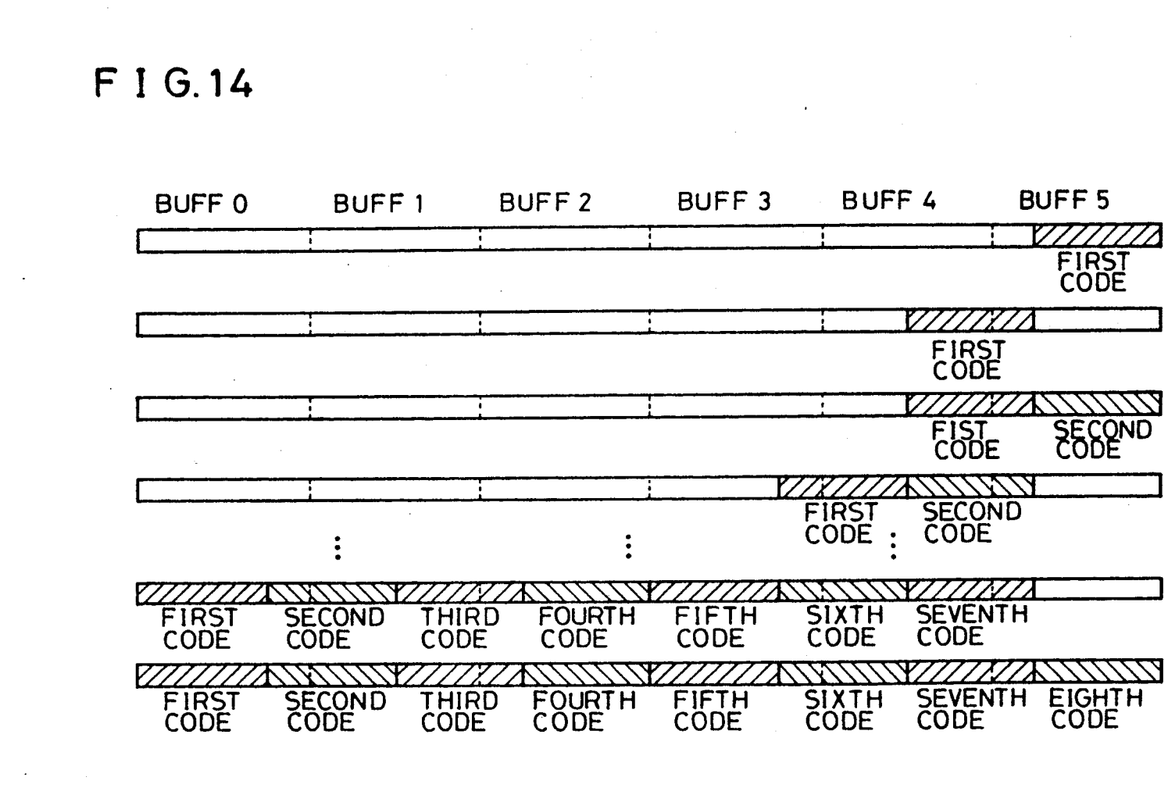
FIG. 14 is an illustrative view showing a state of left-shifting by 6 bits.

Next, in the step S219, the password storing buffer areas WORD0-WORD7 are left-shifted by 6 bits as shown in FIG. 14 in accordance with a subroutine as shown in FIG. 13.

Then, the password storing buffer offset data area WOFF is incremented by "1" in the step S221 and the steps S215-S221 is repeatedly executed by the time when it is confirmed that the offset data becomes "8" in the step S223. Thus, in the buffer areas BUFF0-BUFF5, the data equal to the data which are obtained by changing the arrangement of the game status data in generating the password are restored.

Figure 12:
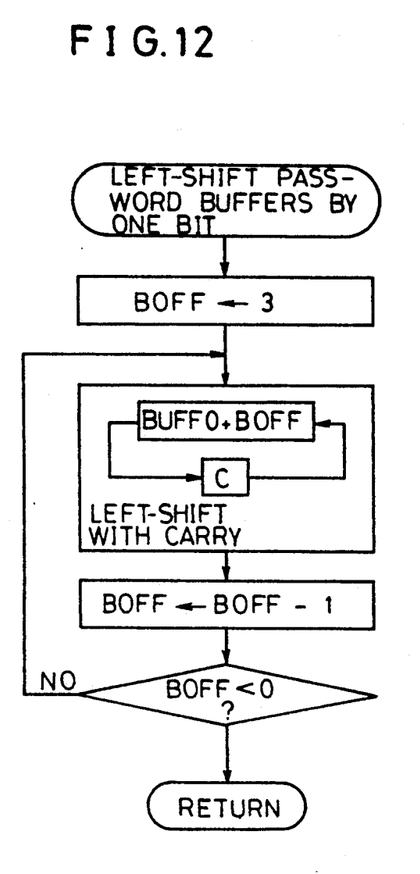
FIG. 12 is a flowchart showing a subroutine for left-shifting buffer areas by 1 bit.

In the following step S225, the microcomputer 24 loads the data stored in the buffer area BUFF4, that is, random number data obtained in the previous step S109 (FIG. 5) to the shift counter SFCUN again, and the in the step S227, the microcomputer 24 loads the stage number data stored in the buffer area BUFF3 to the accumulator Acc likewise in the previous step S115 (FIG. 5). Then, in the steps S229-S235, the microcomputer 24 causes the buffer areas BUFF0-BUFF3 to be left-shifted by 1 bit by the number of times as same as the previous steps S117-S123 (FIG. 5). Such left-shifted shifted by 1 bit is performed in accordance with the subroutine as shown in FIG. 12. Thus, in these steps S229-S235, the state of the buffer areas BUFF0-BUFF3 which have been right-shifted in the previous step S117-S123 is restored to the state before generating the password.

Thereafter, the sum-check is performed in the step S237, and in the step S239, it is determined whether or not the data in the sum-check data area SUM and the data in the buffer area BUFF5 which was shifted are coincident with each other, that is, the sum data which has been checked in the step S111 of FIG. 5 and the sum data being checked in the step S237 are coincident with each other. If not coincident, the microcomputer 24 causes the TV monitor to display an image for requesting to input the password again on the screen thereof so as to demand the operator to input the password again.

If erroneous password is continuously inputted for any length of time, a suitable process may be performed to disable the start of the game.

If the results of the sum-check are coincident with each other, the data of the password inputted at this time is determined as a true password, and the process returns to the main routine as shown in FIG. 4.

Figure 15:
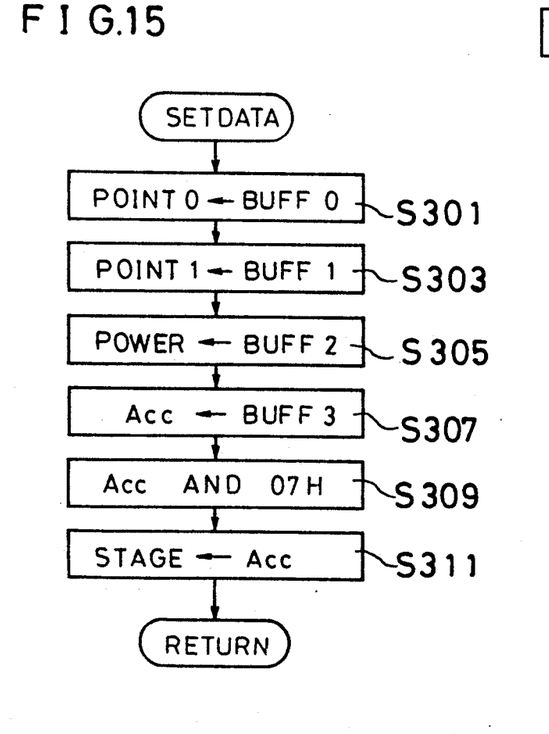
FIG. 15 is a flowchart showing a subroutine for setting game status data.

Thus, in the case of "Continue", when the password is inputted by the operator, in the step S23, the microcomputer 24 sets the game status data obtained from the inputted password in the game status data area of the W-RAM 26. The step S23 is executed in accordance with the subroutine as shown in FIG. 15. More specifically, the data stored in the buffer area BUFF0 is loaded to the score data area POINT0 as the data of the upper 2 digits of the score data in the step S301, and in the step S303, the data stored in the buffer area BUFF1 is loaded to the score data area POINT1 as the data of the lower 2 digits of the score data. In the step S305, the data stored in the buffer area BUFF2 is loaded to the power data area POWER as the data of the power or energy. In the step S307, the data stored in the buffer area BUFF3 is loaded to the accumulator Acc, and in the step S309, the microcomputer 24 processes the data of the accumulator Acc and the data 07H, i.e. "00000111" in AND manner, and only the data of the accumulator Acc, that is, the lower 3 bits of the data in the buffer area BUFF3 are made effective to obtain the stage number data. Then, the stage number data obtained in the accumulator Acc is loaded to the stage number area STAGE.

Thus, in the respective data areas of the W-RAM 26, the game status data including the score, the power or energy and the stage number is restored in accordance with the inputted password. Therefore, in the case of "Continue", if the game is started in the step S9 (FIG. 4), the game will be executed in the step S11 so as to progress based upon the game status data restored and loaded in the W-RAM 26.

Therefore, in accordance with this embodiment shown, even if only ROM is provided in the memory cartridge for the program memory 18 and the character memory 20, in the case of "Continue", it is possible to start the game consecutively from the game status of the preceding game which has been terminated previously.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus, comprising:
    a microprocessor;
    a program memory connected to said microprocessor for storing a game program to be executed by said microprocessor;
    a game terminating means provided in association with said microprocessor for terminating a game being executed by said microprocessor in accordance with said game program stored in said program memory;
    a data storage;
    a password generating means for generating a password based upon game status data being stored in said data storage at the time when the game has been terminated by said game terminating means;
    a displaying means for displaying the password generated by said password generating means;
    an instructing means for permitting an operator to instruct that the game be subsequently started at a point corresponding to the point when the game was terminated;
    an inputting means for enabling an operator to input a password when starting of the game is instructed by said instructing means;
    a data setting means for setting said game status data in said data storage based upon an inputted password, wherein said password generating means includes a modifying means for modifying said game status data stored in said data storage, and said data setting means includes a restoring means for restoring data obtained from the inputted password into the game status data stored in said data storage, wherein said data storage includes a data area for storing data used during password generation, wherein said modifying means includes a shifting means for shifting the data being stored in said data area; and means for generating a random number, wherein said shifting means includes a means for shifting the data being stored in said data area by a number of bits determined by the random number.

2. A game apparatus in accordance with claim 1, wherein said restoring means includes a reverse shifting means for shifting the data in reverse to said modifying means.

3. A game apparatus in accordance with claim 1, wherein said program memory is included in a memory cartridge which is attachably/detachably loaded to said microprocessor.

4. A game apparatus in accordance with claim 1, wherein said shifting means shifts data in a first shifting direction and wherein said restoring means includes a further modifying means for modifying said inputted password to generate modified data and additional shifting means for shifting said modified data in a shifting direction reverse to said first shifting direction, the number of shifting times determined by data included in said inputted password.

5. A game apparatus in accordance with claim 1, wherein said game status data includes data composed of a plurality of words indicative of a plurality of game status conditions, each of said plurality of words being constituted by a plurality of bits, wherein said password generating means produces a password including a plurality of words, each of which is composed of a number of bits less than the number of bits of a word of said game status data.

6. A game apparatus in accordance with claim 5, wherein said password generating means produces a password the number of bits of which is equal to the number of bits of said game status data and the number of words of which is less than the number of words of said game status data.

7. A memory cartridge having a program memory and capable of being attachably/detachably loaded into a game machine which includes a microprocessor and a data storage provided in association therewith, said memory cartridge comprising:

random number generating program means for enabling said microprocessor to generate a random number;

first password program means for enabling said microprocessor to produce a password based upon game status data stored in said data storage, said first password program means including first shifting means for shifting said game status data in a first shifting direction, the number of shifting times being determined by said random number to generate shifted data and first modifying means for modifying said shifted data to produce said password;

second password program means for enabling said microprocessor to process a password input by a player generated in association with said first password program means; and third program means for enabling said microprocessor to set predetermined game status data in said data storage based upon an inputted password, said third program means including restoring means for restoring status data obtained from said inputted password into said game status data stored in said data storage.

8. A memory cartridge in accordance with claim 7, wherein said restoring means includes means for shifting the data in a reverse direction from said first shifting direction means.

9. A memory cartridge in accordance with claim 7, wherein said restoring means includes second modifying means for modifying said inputted password to generate modified data and second shifting means for shifting said modified data in a second shifting direction reverse to said first shifting direction by said first shifting means, the number of shifting times determined by said shifting times data included in said inputted password.

10. A memory cartridge in accordance with claim 9, wherein said first modifying means includes AND logic means for ANDing said shifted data and said random number.

11. A memory cartridge in accordance with claim 7, wherein said game status data includes data composed of a plurality of words indicative of a plurality of game status conditions, each of said plurality of words being constituted by a plurality of bits, wherein said first password program means produces a password including a plurality of words, each of which is composed of a number of bits less than the number of bits of a word of said game status data.

12. A memory cartridge in accordance with claim 11, wherein said first password program means produces a password the number of bits of which is equal to the number of bits of said game status data and the number of words of which is less than the number of words of said game status data.

13. A memory cartridge in accordance with claim 11, wherein said second modifying means includes OR logic means for ORing said inputted password and said shifting times data.

14. A method for consecutively starting a game, comprising the steps of:

(a) terminating a game being executed by a microprocessor in accordance with a program stored in a program memory;

(b) generating a password based upon game status data being stored in a data storage at the time when the game has been terminated, said generating step including the steps of generating random number data, and modifying an arrangement of the stored game status data by bit-shifting the stored game status data in accordance with said random number data;

(c) displaying the password thus generated;

(d) instructing that the game is to be started consecutively such that the game may be subsequently started at a point corresponding to the point where the game was terminated;

(e) enabling an operator to input a password when consecutive starting of the game is instructed; and (f) setting the game status data in the data storage based upon an password inputted by the operator.

* * * * *